United States Patent [19]

Delbor

[11] Patent Number: 5,725,305
[45] Date of Patent: Mar. 10, 1998

[54] WHISK

[76] Inventor: Louise Delbor, Solbergsvagen 5A, S-811 31 Sandviken, Sweden

[21] Appl. No.: 737,674
[22] PCT Filed: May 24, 1995
[86] PCT No.: PCT/SE95/00592
  § 371 Date: Nov. 21, 1996
  § 102(e) Date: Nov. 21, 1996
[87] PCT Pub. No.: WO95/32657
  PCT Pub. Date: Dec. 7, 1995

[30] Foreign Application Priority Data

May 26, 1994 [SE] Sweden .................. 9401801

[51] Int. Cl.$^6$ .................. A47J 43/10
[52] U.S. Cl. .................. 366/129; 416/70 R
[58] Field of Search .................. 366/129, 130, 366/342, 344; 416/69, 70 R, 227 R, 231 R, 231 A, 231 B, 235; 15/141.1, 141.2; 99/348; D7/376–380, 412, 688, 690

[56] References Cited

U.S. PATENT DOCUMENTS

| 504,112 | 8/1893 | Paine | 366/343 X |
| 678,586 | 7/1901 | Preston | 15/141.1 |
| 698,065 | 4/1902 | Sims | 15/141.1 |
| 781,917 | 2/1905 | Smith | 416/70 |
| 1,140,341 | 5/1915 | Johnston et al. | 416/227 X |
| 2,278,398 | 3/1942 | Wittmann | 366/343 |
| 2,670,938 | 3/1954 | Wittmann | 366/343 |
| 2,694,880 | 11/1954 | Artese et al. | 15/141.1 X |
| 2,906,510 | 9/1959 | Harris | 15/141.1 X |
| 5,219,223 | 6/1993 | Schmitt . | |

FOREIGN PATENT DOCUMENTS

| 28975 | 8/1957 | Finland . | |
| 1526640 | 12/1989 | U.S.S.R. | 366/332 |
| 1769851 | 10/1992 | U.S.S.R. | 366/343 |
| 102670 | of 1916 | United Kingdom . | |

Primary Examiner—Charles E. Cooley
Attorney, Agent, or Firm—Young & Thompson

[57] ABSTRACT

An adaptable whisk for smooth and pliable whipping, beating or mixing of ingredients, such as eggs, cream, sauce, etc., in containers with a variety of different shapes. The whisk includes a longitudinally extending handle (1) having two legs (4) at the lower end and a whipping member in the form of a helical spring (14). The ends of the helical spring (14) are threaded onto the legs (4), respectively, and safely secured on two fixation members (8) at a preselected distance from the end of the legs (4).

5 Claims, 1 Drawing Sheet

WHISK

BACKGROUND OF THE INVENTION

1. Field of the Invention

The present invention relates to an adaptable whisk for smooth and pliable whipping, beating or mixing of ingredients, such as eggs, cream, sauce etc., which follows the surface in containers with a variety of different shapes.

2. Description of the Prior Art

It is a well known fact that it is difficult to fully reach all surfaces in a container with a whisk, without having to tip or rotate the container, while whipping or beating for example eggs or cream. This process often leads to unsuitable angles for the wrist, while whipping, and is thus not ergonomic, especially for persons with weak wrists.

U.S. Pat. No. 5,219,223 describes a whisk adapted to contact a large surface of the bottom of a flat-bottomed container, such whisk reaching into the corners of the container. The whipping member of the whisk is rigid, i.e. the whisk is specially designed for flat-bottomed containers and is therefore only suitable for that purpose. The whipping performance in non-flat-bottomed containers is therefore poor.

The whisk in the above mentioned U.S. patent is further bulky and requires a lot of space in a kitchen drawer, which might make it difficult to open and close the drawer.

GB-A-102 670 describes improvements in or relating to spoons. The spoon is adapted to remove liquids from awkwardly located parts or places from a necked bottle. This is achieved by using the mechanical properties of the material of which the spoon is designed. The stem and the bowl of the spoon are formed as one piece and are not articulated, but merely use the mechanical properties of the material to bend the bowl relative to the stem at a suitable angle.

This design therefore has to be regarded as a semi-rigid construction which not without considerable force follows the surface of the bottle.

This patent is further directed towards removing a viscous liquid from a necked bottle and not towards whipping, beating or mixing ingredients.

FI-28 975 describes a whisk designed to eliminate splashes while whipping. The whipping part of the whisk comprises a wire covered with a helical spring to enhance the whipping capacity. The wire is basically formed like a U, but makes a turn inwards at one of the sides of the U to form an O in the space between the two sides of the U. The O-shape of the wire prevents splashes while whipping. The two wire ends are provided with loops, which are attached to the handle. The attachment between the whipping part and the handle of the whisk is rigid, i.e. the whisk is not able to reach all surfaces in a variety of different containers.

Furthermore this whisk, like the whisk in the above mentioned U.S. patent, is bulky and requires a lot of space in a kitchen drawer, which might make it difficult to open and close the drawer.

There are furthermore a variety of different whisks on the market, all of which have a rigid attachment between the handle and the whipping part of the whisk and suffer from the same problems as mentioned above in conjunction with the U.S. patent and the Finnish patent.

There is therefore a need for a whisk, which could adapt itself to a variety of different containers and which smoothly and pliably and without strain on the wrist follows the contours of the container and at the same time requires a minimum of storing space.

SUMMARY OF THE INVENTION

The object of the present invention is to solve the problems of prior art whisks mentioned above.

These problems are solved by providing a springing and articulation attachment between the handle and the whipping member of the whisk.

In particular, a whisk is provided for whipping, beating and mixing ingredients in a container. The whisk comprises a longitudinally extending handle having mounting means at a lower end and a whipping member comprising a single spirally wound filament. The spirally wound filament is flexibly attached to the mounting means in such a way that the mounting means extends into each end portion of the spirally wound filament. The spirally wound filament is flexible up to 180° in both directions around the end of the mounting means.

The springing and articulation attachment between the handle and the whipping member of the whisk secures a smooth and pliable whipping, while the whipping member follows the contours of the container without putting any strain on the wrist, giving the whisk according to the present invention excellent ergonomic features.

BRIEF DESCRIPTION OF THE DRAWINGS

The invention will be explained more fully below in connection with preferred embodiments and with reference to the drawings, in which.

DESCRIPTION OF THE PREFERRED EMBODIMENTS

Figure 1A:
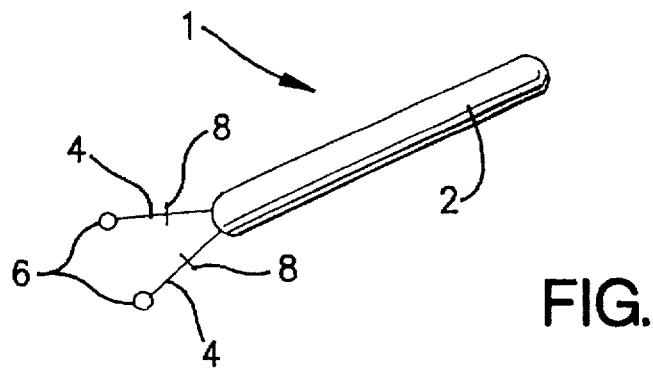
FIG. 1a is a view of the handle of the whisk.

The handle 1 of the whisk, which is shown in FIG. 1a, comprises a grip 2, mounting means such as two legs 4, two loops 6 and two fixation means such as stoppers 8.

At the lower end of the grip 2, which is used to hold the whisk while whipping, i.e. at the end of the grip 2 that extends towards the whipping member 9 of the whisk, there are provided two legs 4 which together basically have a shape of an upside down V. The two ends of the legs 4 which are not attached to the grip 2 are each provided with a loop 6. The distance between the two loops 6 is equal to the distance between two loops 10 provided on the whipping support member 9 of the whisk to be described below.

The legs 4 are further provided with two stoppers 8 at a position between the two loops 6 of the legs 4 and the attachment of the legs 4 to the grip 2. The function of the two stoppers 8 will be described more fully in connection with FIG. 2 below.

Figure 1B:
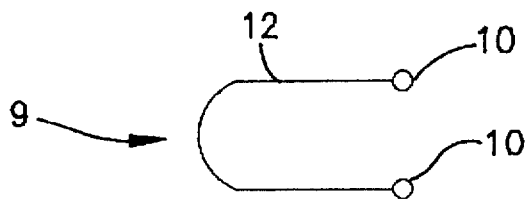
FIG. 1b is a view of the whipping member of the whisk without the helical spring.

FIG. 1b shows the whipping support member 9 of the whisk, without its helical spring 14. The whipping support member 9 comprises a U-shaped wire 12 having a loop 10 at each end of U.

Figure 2:
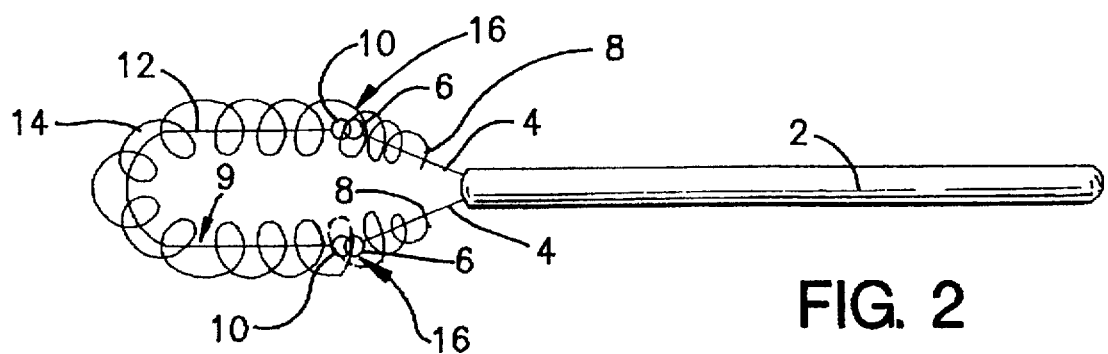
FIG. 2 is an overall view of the whisk in a first embodiment.

FIG. 2 shows the assembled whisk with its two main parts, the handle 1 and the whipping support member 9 to which is attached the helical spring 14. The helical spring 14 is threaded onto the U-shaped wire 12, and the handle 1 and the whipping support member 9 are attached to each other by means of their loops 6, 10, respectively, to form a springing and articulation attachment 16 between the handle 1 and the whipping member 9 of the whisk. The two ends of the helical spring 14 extend beyond the springing and articulation attachment 16 and abut the stoppers 8 provided on the two legs 4 of the handle 1. The two ends of the helical spring 14 exhibit a smaller diameter than the rest of the helical spring 14, i.e. it is smaller than the diameter of the stopper 8 and the springing and articulation attachment 16 to secure that the helical spring 14 is safely located therebetween.

Figure 3:
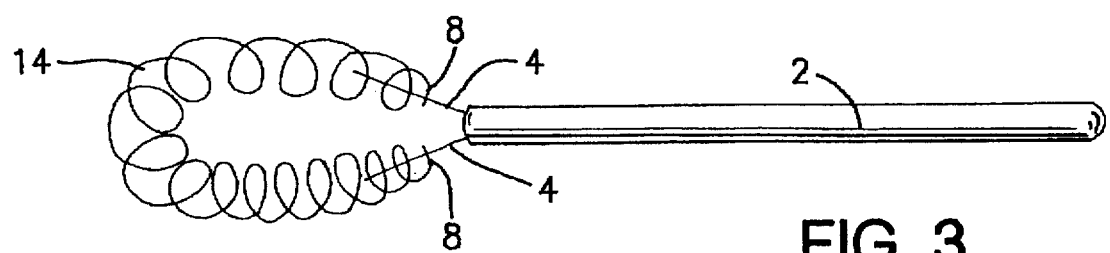
FIG. 3 is an overall view of the whisk in a second embodiment.

FIG. 3 shows a second embodiment of the present invention in which the whipping member is limited to the helical spring 14, i.e. the U-shaped wire is left out. The remaining part of the whisk is identical to the one shown in FIG. 2 and is therefore not described further. The helical spring 14 is still safely secured at the fixation means 8 and free to flex 180° in both directions in regard to an imaginary axis between the two legs 4.

The arrangement of the helical spring 14 extending past the imaginary axis of the two legs 4 is the key to the springing features of the whisk. While whipping or beating, for example cream or sauce, the whisk will adapt itself to the contours of different containers on the market and give a smooth, pliable and effective whipping or beating.

Furthermore, the springing feature of the whisk makes it easy to store, since the whisk always will be flat while not in use.

Although the present invention has been described with respect to specific embodiments thereof, various changes, and modifications may be suggested to one skilled in the art. For example, the two legs onto which the helical spring is attached could be made in one piece, such as a U, with the bottom of the U-shaped piece facing the whipping member. Therefore, it is intended that the present invention encompass such changes and modifications as fall within the scope of the appended claims.

I claim:

1. A whisk for whipping, beating and mixing ingredients in a container, comprising a rigid longitudinally extending handle (1) having mounting means (4) at the lower end and a whipping member comprising a single spirally wound filament (14) with end portions, said spirally wound filament (14) being flexibly attached to said mounting means (4) in such a way that said mounting means (4) extends into each end portion of said spirally wound filament (14), said spirally wound filament (14) being flexible up to 180° in both directions around an end point of said mounting means (4).

2. A whisk for whipping, beating and mixing ingredients in a container, comprising a longitudinally extending handle (1) having mounting means (4) at an end of said handle, and a whipping member comprising a U-shaped flexible spirally wound filament (14) including a spirally wound first end portion and an opposing spirally wound second end portion, said spirally wound first end portion and said opposing spirally wound second end portion being attached to said mounting means (4), said mounting means (4) extending into said spirally wound first end portion and said opposing spirally wound second end portion, said flexible spirally wound filament (14) being flexible up to 180° in both directions around an end point of said mounting means (4), a U-shaped member extending inside of said flexible spirally wound filament, said U-shaped member having one end and an opposite end, said one end and said opposite end being attached to said mounting means by a hinged joint.

3. The whisk according to claim 2 wherein said mounting means comprises a first leg attached to said spirally wound first end portion, said first leg comprising a first loop, and a second leg attached to said opposing spirally wound second end portion, said second leg comprising a second loop, and further wherein said one end of said U-shaped member comprises a third loop which is coupled to said first loop, to provide a first articulation attachment, and said opposite end of said U-shaped member comprises a fourth loop which is coupled to said second loop to provide a second articulation attachment.

4. The whisk according to claim 3 wherein said first leg comprises a first fixation means positioned between said first articulation attachment and said end of said handle, and said second leg comprises a second fixation means positioned between said second articulation attachment and said end of said handle, said spirally wound first end portion being positioned between said first fixation means and said first articulation attachment and having a diameter which is less than a diameter of said first fixation means and a diameter of said first articulation attachment, and said opposing spirally wound second end portion being positioned between said second fixation means and said second articulation attachment and having a diameter which is less than a diameter of said second fixation means and a diameter of said second articulation attachment.

5. A whisk for whipping, beating and mixing ingredients in a container, comprising a longitudinally extending handle having mounting means at an end of said handle, and a whipping member comprising a flexible spirally wound filament including a spirally wound first end portion which is spirally wound around a first longitudinal axis and an opposing spirally wound second end portion which is spirally wound around a second longitudinal axis, said spirally wound first end portion and said opposing spirally wound second end portion being attached to a respective first leg and second leg of said mounting means, said first leg extending in the direction of said first longitudinal axis and into said spirally wound first end portion and said second leg extending in the direction of said second longitudinal axis and into said opposing spirally wound second end portion, said flexible spirally wound filament being flexible up to 180° in both directions around an end point of said mounting means.

* * * * *